US012804467B2

(12) United States Patent
Hua et al.

(10) Patent No.: US 12,804,467 B2
(45) Date of Patent: Nov. 17, 2026

(54) MOBILE NETWORK LOAD RELIEF BASED ON MACHINE LEARNING ANALYTICS

(71) Applicant: Verizon Patent and Licensing Inc., Basking Ridge, NJ (US)

(72) Inventors: Suzann Hua, Beverly Hills, CA (US); Ye Huang, San Ramon, CA (US); Chien-Yuan Huang, Basking Ridge, NJ (US); Tony Ferreira, Greenwich, CT (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 288 days.

(21) Appl. No.: 18/672,579

(22) Filed: May 23, 2024

(65) Prior Publication Data

US 2025/0365617 A1 Nov. 27, 2025

(51) Int. Cl.

*H04W 28/08* (2023.01)
*H04W 4/12* (2009.01)
*H04W 12/06* (2021.01)

(52) U.S. Cl.

CPC ......... *H04W 28/0942* (2020.05); *H04W 4/12* (2013.01); *H04W 12/06* (2013.01)

(58) Field of Classification Search

None

See application file for complete search history.

(56) References Cited

U.S. PATENT DOCUMENTS

| | | | | |
|---|---|---|---|---|
| 2020/0337101 | A1* | 10/2020 | Brooks | H04W 64/00 |
| 2023/0306318 | A1* | 9/2023 | Garg | G06Q 10/04 |
| 2024/0155038 | A1* | 5/2024 | Cui | H04L 67/51 |

* cited by examiner

*Primary Examiner* — Luna Weissberger

(57) ABSTRACT

A network device receives, from a machine learning (ML) engine, predicted future network load conditions associated with UE traffic at nodes, network elements (NEs), and/or network functions (NFs) in a mobile network. The network device applies policies to the predicted future network load conditions to select UEs as candidates for temporary downgrades in mobile network service, and initiates sending of authorization requests to the selected UEs to request authorization for the implementation of a temporary downgrade in mobile network service for each of the selected UEs. The network device causes mobile network service to be downgraded to one or more of the selected UEs, for a temporary time period, based on responses to the authorization requests.

20 Claims, 10 Drawing Sheets

MOBILE NETWORK LOAD RELIEF BASED ON MACHINE LEARNING ANALYTICS

BACKGROUND

Mobile networks, such as, for example, Next Generation mobile networks (e.g., Fifth Generation (5G) mobile networks) include numerous Network Functions (NFs) and/or Network Elements (NEs) that work cooperatively to operate the mobile network and provide wireless service to subscribing user equipment devices (UEs). The NFs/NEs may perform, among many other functions, mobile network access management, session management, and policy control. Given the ubiquity of mobile UEs, such as "smart" phones, NFs/NE s handling control plane and/or user plane traffic associated with providing mobile network service to numerous UEs may experience overload conditions during particular peak periods of UE-related traffic. During such periods, each NF/NE experiencing an overload may analyze the priority of the received control plane and/or user plane message traffic and may drop those messages not having a certain level of priority (i.e., drop low priority messages). Dropping of UE-related messages unavoidably degrades mobile network service to those UEs, without prior notice, and negatively impacts the UE user's overall experience when using the mobile network.

DETAILED DESCRIPTION OF EXAMPLE EMBODIMENTS

The following detailed description refers to the accompanying drawings. The same reference numbers in different drawings may identify the same or similar elements. The following detailed description does not limit the invention.

A Network Data Analytics Function (NWDAF) is a NF that has been implemented in 5G mobile networks for collecting and analyzing data from various NFs/NEs within the mobile networks. The NWDAF may collect and analyze data from UEs, NFs, NEs, and operations, administration, and maintenance (OAM) systems associated with the mobile network. The NWDAF may, as described herein, use Artificial Intelligence (AI) and/or machine learning (ML) techniques ("AI/ML," or referred to herein simply as "ML") to generate predictive load condition analytics related to traffic loads incurred by the NFs/NE s of the mobile network. The NWDAF may further, as described herein, collect and analyze, using ML techniques, UE communication session behavior from particular NFs (e.g., Access and Mobility Management Function (AMF), Session Management Function (SMF), or the like) in the mobile network and generate predictive session behavior for each UE. The NWDAF may supply the predictive load condition analytics and predictive UE-specific session behavior analytics to, for example, a Policy Control Function (PCF) of the mobile network. The PCF may subsequently apply policies to the predictive data to identify particular UEs for a possible temporary downgrade in network service to the UEs. The PCF, in coordination with another application or NF, requests authorization, via, for example, text or email message, from the user associated with each identified UE to voluntarily and temporarily downgrade their network service. Such an authorization request may, in some instances, include offering an incentive(s) to the user to encourage the user to accept the temporary downgrade to their mobile network service. Temporarily downgrading the network service to a particular set of UEs identified by the PCF may relieve load on the mobile network and improve network service to other UEs in the mobile network during the temporary period of time, such as during a period of peak UE traffic.

Figure 1:
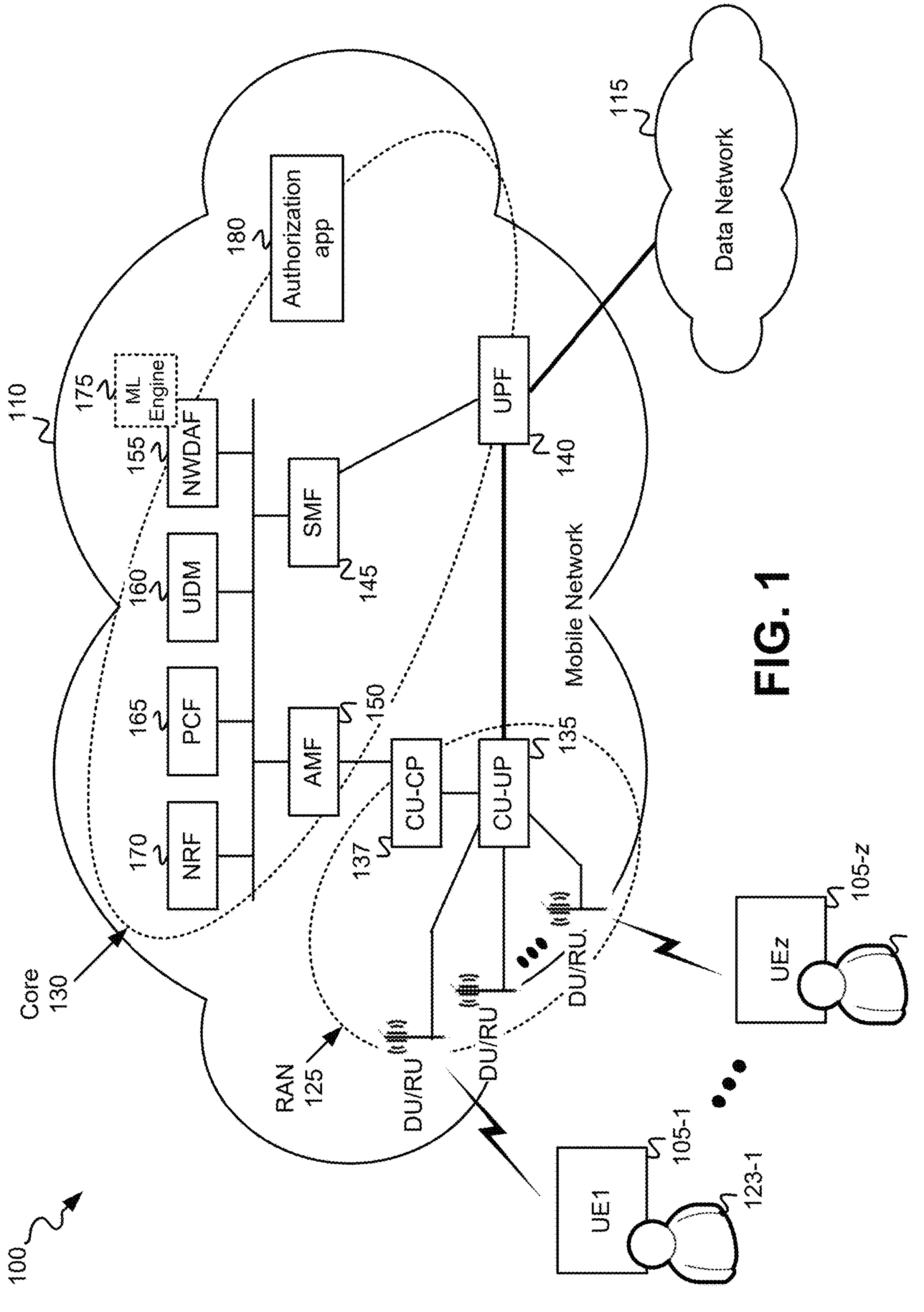
FIG. 1 depicts an example of a network environment in which network load relief may be implemented based on Machine Learning analytics.

FIG. 1 depicts an example of a network environment 100 in which network load relief may be implemented based on ML analytics. As shown, network environment 100 may include UEs 105-1 through 105-*z* (generically referred to herein as a "UE 105" or "UEs 105"), a mobile network 110, and a data network(s) 115.

UEs 105-1 through 105-*z* may each include any type of device having a communication capability, such as, for example, a wireless communication capability. UEs 105 may include, for example, a laptop, palmtop, wearable, or tablet computer; a cellular phone (e.g., a "smart" phone); a Voice over Internet Protocol (VoIP) phone; an audio speaker (e.g., a "smart" speaker); a gaming system; a music player (e.g., a digital audio player); a digital camera; a device in a vehicle; a wireless telematics device; an Augmented Reality/Virtual Reality (AR/VR) headset or glasses; or an Internet of Things (IoT) or Machine-to-Machine (M2M) device. A user may carry, use, administer, and/or operate each UE 105. A user 123-1 is shown in association with UE 105-1 and a user 123-*z* is shown in association with UE 105-*z*. Each user 123 may alternatively be referred to herein as a "network subscriber" or "subscriber."

Each UE 105 may have installed, and may execute, at least one application (app) (not shown) that can be used to establish data sessions with a respective app server (not shown), or with another destination node (not shown). In some circumstances, the app servers may connect to data network 115, and may be reachable from mobile network 110 via UPF 140. Each UE 105 can be installed with, and may execute, multiple apps whose associated traffic (e.g., control plane traffic, user plane traffic) may transit and/or be handled by NFs/NEs of mobile network 110.

Mobile network 110 may include a Public Land Mobile Network (PLMN) (referred to herein as a "mobile network 110" or a "network 110") and possibly one or more other networks (e.g., an edge network(s), a far edge network(s)). Mobile network 110 may include one or more sub-networks, such as a Radio Access Network (RAN) 125 and a mobile core network 130 (referred to herein as "core network 130" or "mobile core network 130"). The sub-networks of mobile network 110 may include one or more NEs, nodes, or NFs that interconnect among one another, and/or with data network 115.

RAN 125 may include various types of radio access equipment that implement wireless Radio Frequency (RF) communication with UEs 105. The radio access equipment of RAN 125 may include, for example, multiple Distributed Units (DUs) and Remote Units (RUs), and at least one Control Unit-User Plane function (CU-UP) 135 and at least one Control Unit-Control Plane (CU-CP) function 137. Additionally, or alternatively, RAN 125 may include non-split or integrated RAN devices, such as a Next Generation NodeB (gNB). Only a single one of CU-UP 135 and CU-CP 137 is shown in FIG. 1, however, RAN 125 may include multiple CU-CPs and CU-UPs. Each DU includes a logical node that hosts functions associated with the Radio Link Control (RLC) layer, the Medium Access Control (MAC) layer, and the physical layer (PHY). A RU may be connected to a respective DU, and each RU may include at least one radio transceiver, and associated antenna(s), for RF wireless communication with one or more UEs 105 within radio range of the RU.

CU-UP 135 may interconnect with one or more DUs of RAN 125, and may include a NF or logical node that hosts user plane functions, such as, for example, data routing and transport functions. CU-CP 137 includes a NF or logical node that hosts Radio Resource Control (RRC), and other control plane, functions (e.g., Service Data Adaptation Protocol (SDAP), Packet Data Convergence Protocol (PDCP)) for controlling the CU-UP 135. CU-UP 135 and/or CU-CP 137 may further connect to NFs of core network 130 (e.g., AMF 150, UPF 140). RAN 125 may additionally include other nodes, functions, and/or components not shown in FIG. 1.

Core network 130 includes devices or nodes that implement NFs (e.g., Virtual Networks (VNFs)) or NEs which operate the mobile network 110 including, among other NFs or NEs, mobile network access management, session management, and policy control NFs/NEs. In the example network environment 100 of FIG. 1, core network 130 is shown as including a 5G mobile network that further includes 5G NFs, such as a User Plane Function (UPF) 140, a SMF 145, an AMF 150, a NWDAF 155, a Unified Data Management (UDM) function 160, a PCF 165, and a Network Repository Function (NRF) 170. UPF 140, SMF 145, AMF 150, NWDAF 155, UDM 160, PCF 165, and NRF 170 may be implemented as VNFs within mobile network 110. Core network 130 may additionally include, as shown in FIG. 1, an authorization app 180. Alternatively, authorization app 180 may be implemented outside of core network 130, or may be implemented in data network 115.

UPF 140 may act as a router and a gateway between mobile network 110 and data network 115, and forwards session data between data network 115 and RAN 125. Though only a single UPF 140 is shown in FIG. 1, mobile network 110 may include multiple UPFs 140 at various locations in network 110. SMF 145 performs session management, allocates network addresses to UEs 105, and selects and controls UPFs 140 for data transfer. AMF 150 performs authentication, authorization, and mobility management for UEs 105.

NWDAF 155 may implement a ML engine 175 that obtains load condition data from various nodes/NEs/NFs in mobile network 110 (e.g., UPF 140, SMF 145, AMF 150, UDM 160, PCF 165, NRF 170) and analyzes the load condition data to determine current load conditions and/or to predict future load conditions at one or more nodes/NEs/NFs in mobile network 110. The load condition data may include, for example, data describing a bandwidth utilization, a packet rate, an error rate, and/or a latency associated with each of various nodes/NEs/NFs in mobile network 110. Bandwidth utilization includes an amount of data transferred per second at a node/NF. Packet rate includes a number of packets transmitted per second at a node/NF. Error rate includes a number of failed data packets as compared to a total number of packets sent at a node/NF, and latency includes an amount of time taken for data to travel from, and return to, a node/NF.

ML engine 175 may further collect UE-specific communication session data from NEs/NFs of mobile network and analyze the UE-specific communication session data to determine current, and/or predict future, aspects of each UE 105's session behavior. The analysis may, for example, identify specific UEs 105 that engage in a particular level of traffic (e.g., low or high levels of traffic) with particular NEs/NFs, or with a group(s) of NEs/NFs (e.g., multiple control plane NEs/NFs, multiple user plane NEs/NFs), of mobile network 110 (e.g., SMF 145, AMF 150). The level of traffic may, for example, relate to a number of a UE 105's packets received over a specified period of time at a particular NE/NF, or a group of NEs/NFs (e.g., control plane NEs/NFs, user plane NEs/NFs) in mobile network 110. Thresholds may be specified for the number of packets received over the specified period of time to determine whether a particular UE is associated with a low or high level of traffic. ML engine 175 may be implemented in software as a component of NWDAF 155, or may be implemented in hardware and/or software (e.g., a VNF) at a separate device that connects to NWDAF 155.

UDM 160 manages data for user access authorization, user registration, and data network profiles. The UDM 160 may operate in conjunction with a Unified Data Repository (UDR) (not shown) which stores user data, such as subscriber service profiles, temporary subscriber service profiles, customer authentication information, and encryption keys. PCF 165 implements policy and charging control for data flows and session related policy control. As described further herein, PCF 165 may apply policies to load condition analytic data and/or UE session behavior analytic data to identify UEs 105 for a possible temporary user-authorized downgrade of network service to the UEs 105.

NRF 170 operates as a centralized repository of information regarding NFs in mobile network 110. NRF 170 enables NFs (e.g., UPF 140, SMF 145, AMF 150, UDM 160) to register and discover each other via an Application Programming interface (API). NRF 170 maintains an updated repository of information about the NFs available in mobile network 110, along with information about the services provided by each of the NFs. NRF 170 further enables the NFs to obtain updated status information of other NFs in mobile network 110. NRF 170 may, for example, maintain profiles of available NF instances and their supported services, allow NF instances to discover other NF instances in mobile network 110, and allow NF instances to track the status of other NF instances.

Authorization app 180 sends messages, based on notifications from PCF 165, to UEs 105 to request user authorization for a temporary network service downgrade. The messages may be text messages, email messages, instant messages, automated telephone calls, or other types of messages. Authorization app 180 may send a report(s) to PCF 165, or other node, NE, or NF in mobile network 110, that identifies the users (and associated UEs 105) that have authorized the temporary network service downgrade.

Data network 115 may include one or more interconnected networks, such as local area networks (LANs), wide area networks (WANs), metropolitan area networks (MANs), Multi-Access Edge Computing networks (MECs), and/or the Internet. Data network 115 may, for example, connect with UPFs 140 of mobile network 110.

The configuration of network components of the example network environment 100 of FIG. 1 is for illustrative purposes. Other configurations may be implemented. Therefore, network environment 100 may include additional, fewer, and/or different components that may be configured in a different arrangement than that depicted in FIG. 1. For example, core network 130 may include other NFs not shown in FIG. 1. As a further example, though mobile network 110 is depicted in FIG. 1 as a 5G network having 5G network components/functions, mobile network 110 may additionally or alternatively include a Fourth Generation (4G) or 4.5G network with corresponding network components/functions, or a hybrid Next Generation/4G network that includes certain components of both a Next Generation network (e.g., a 5G network) and a 4G network. Additionally, though only a single one of each of the NFs UPF 140, SMF 145, AMF 150, NWDAF 155, UDM 160, PCF 165, and NRF 170 is shown in FIG. 1, mobile network 110 may include multiple instances of each of these NFs.

Figure 2:
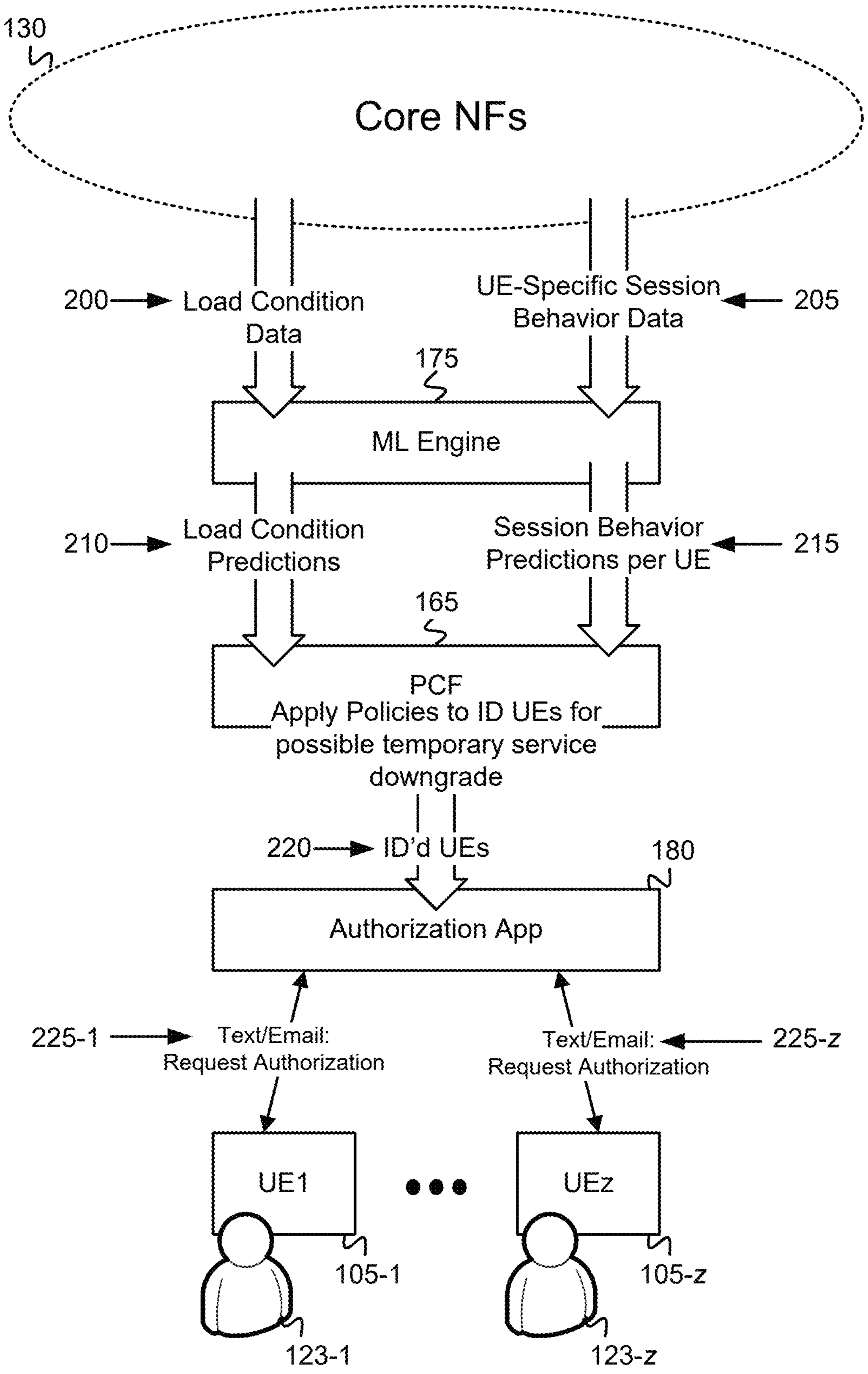
FIG. 2 illustrates an overview of implementing mobile network load relief using machine learning applied to mobile network load conditions and UE-specific session behavior.

FIG. 2 illustrates an overview of implementing mobile network load relief using ML applied to load conditions and UE-specific session behavior, and further based on user/subscriber authorization for temporarily downgrading UE mobile network service. As shown, ML engine 175 may obtain load condition data 200 and UE-specific session behavior data 205 from NFs of mobile core network 130. ML engine 175 may apply existing ML techniques to the load condition data 200 to generate load condition predictions 210 (and/or current load condition analytics in some circumstances), which are passed to PCF 165. ML engine 175 may further apply existing ML techniques to the UE-specific session behavior data 205 to generate session behavior predictions per UE 215 (and/or current session behavior per UE analytics in some circumstances), which are passed to PCF 165.

Upon receipt of load condition predictions 210 and session behavior predictions 215 per UE, PCF 165 may apply policies to the predictions 210 and 215 to identify (ID) at 220, UEs that are candidates for a temporary service downgrade, and passes the ID'd UEs 220 to authorization app 180. Authorization app 180, in turn, sends a message (e.g., a text and/or email message) to each of the ID'd UEs 220 to request authorization by the user/subscriber of each UE for a temporary downgrade in mobile network service. The temporary downgrade in mobile network service may include, for example, a lower Quality of Service (QoS) for each UE. Requesting authorization, in some circumstances, may include offering each user/subscriber an incentive(s) to accept the temporary mobile network service downgrade. One or more of various types of incentives may be offered to the user/subscriber to promote their acceptance of the temporary network service downgrade. Such incentives may include, for example, increasing a maximum data quota or minutes for the user/subscriber's account for a particular period of time, or giving the user/subscriber's account a monetary discount for a period of network service usage (e.g., $1 discount off a monthly subscriber rate for each 4 hour increment of user authorized service downgrade).

When authorization app 180 receives authorizations for the temporary service downgrades from users 123, the authorization app 180 notifies PCF 165 of each authorization. PCF 165, in response, determines a timer value for each authorizing user associated with a UE 105, and instructs UDM 160 (not shown) to change each authorizing user's network service profile to a temporary service profile and associates a respective timer value with each temporary service profile. Each temporary service profile includes data that identifies the downgrade in network service (e.g., a particular lower QoS) authorized by the subscriber/user. Upon successful completion of the service profile changes, PCF 165 instructs authorization app 180 to notify each user (e.g., via text or email) of initiation of the temporary service downgrade for network service to a respective UE 105.

When each timer value associated with a user's temporary service profile expires, UDM 160 (not shown) re-assigns each user's original service profile and notifies PCF 165 of each timer expiration. PCF 165 then instructions authorization app 180 to notify each authorizing subscriber/user that an original service level has resumed to their respective UE 105.

Alternatively, as described in further detail below, ML engine 175 may analyze current load condition data, and current UE-specific session behavior data, and PCF 165 may determine whether to request an extension of a time period associated with the temporary network service downgrade, from users of the previously identified UEs 105, based on the resulting data analytics. Additionally, or alternatively, PCF 165 may determine whether authorization requests for a temporary network service downgrade should be requested from other UEs 105 based on the current load condition and UE-specific session behavior data analytics.

Figure 3:
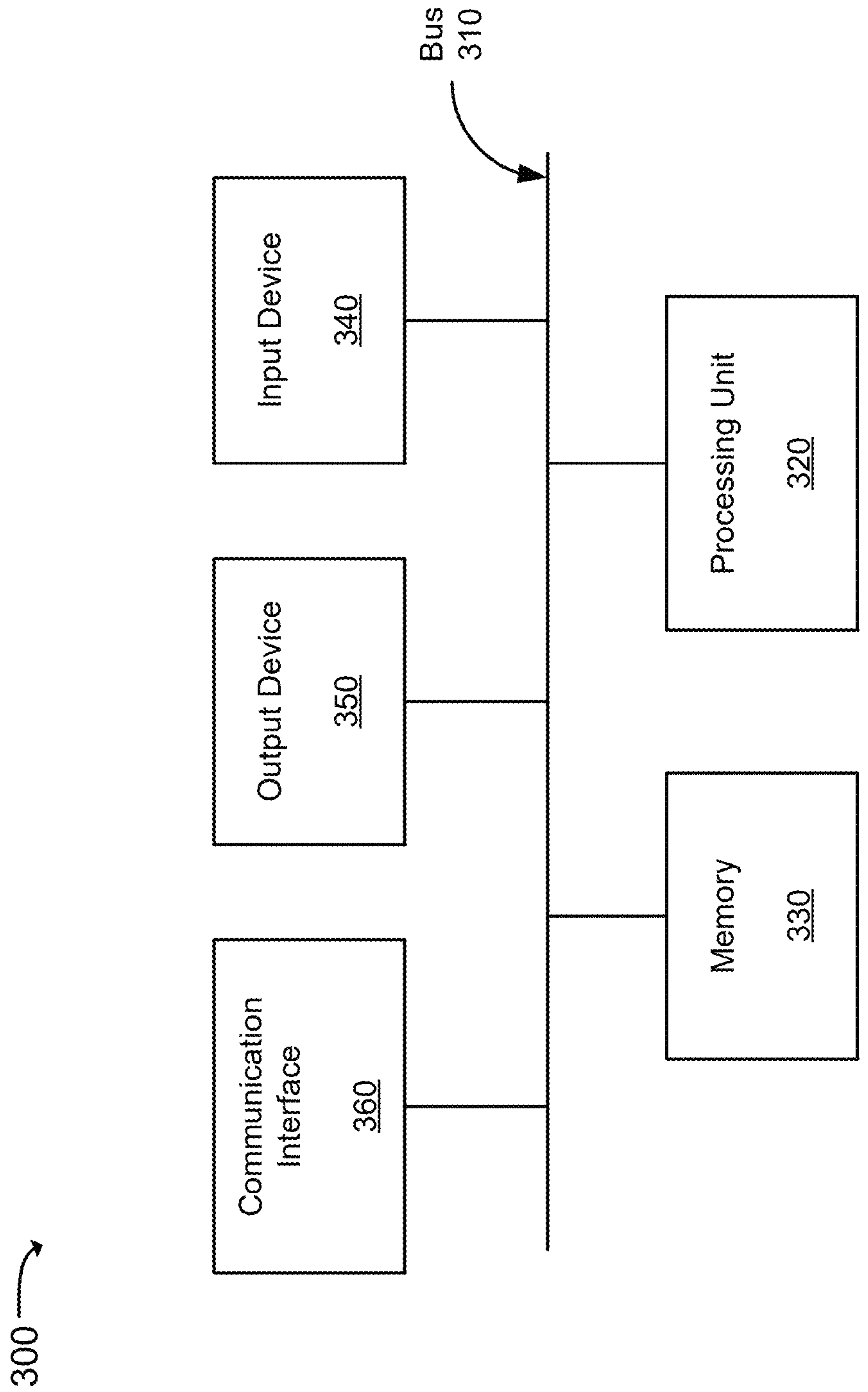
FIG. 3 is a diagram that depicts example components of a network device, as referred to herein.

FIG. 3 is a diagram that depicts example components of a network device 300 (referred to herein as a "network device" or a "device"). UEs 105 and the DUs and RUs of RAN 125 may include components that are the same as, or similar to, those of device 300 shown in FIG. 3. Furthermore, CU-CP 137 and CU-UP 135 of RAN 125, authorization app 180, and each of UPF 140, SMF 145, AMF 150, NWDAF 155, ML engine 175, UDM 160, PCF 165, and NRF 170 may be implemented by a device that includes components that are the same as, or similar to, those of network device 300. Some of the NFs UPF 140, SMF 145, AMF 150, NWDAF 155, ML engine 175, UDM 160, PCF 165, and NRF 170 may be implemented by a same device 300 within mobile network 110, while others of the functions may be implemented by one or more separate devices 300 within mobile network 110.

Device 300 may include a bus 310, a processing unit 320, a memory 330, an input device 340, an output device 350, and a communication interface 360. Bus 310 may include a path that permits communication among the components of device 300. Processing unit 320 may include one or more processors or microprocessors which may interpret and execute instructions, or processing logic. Memory 330 may include one or more memory devices for storing data and instructions. Memory 330 may include a random access memory (RAM) or another type of dynamic storage device that may store information and instructions for execution by processing unit 320, a Read Only Memory (ROM) device or another type of static storage device that may store static information and instructions for use by processing unit 320, and/or a magnetic, optical, or flash memory recording and storage medium. The memory devices of memory 330 may each be referred to herein as a "tangible non-transitory computer-readable medium," "non-transitory computer-readable medium," or "non-transitory storage medium." In some implementations, the processes/methods set forth herein can be implemented as instructions that are stored in memory 330 for execution by processing unit 320.

Input device 340 may include one or more mechanisms that permit an operator to input information into device 300, such as, for example, a keypad or a keyboard, a display with a —touch sensitive panel, voice recognition and/or biometric mechanisms, etc. Output device 350 may include one or more mechanisms that output information to the operator, including a display, a speaker, etc. Input device 340 and output device 350 may, in some implementations, be implemented as a user interface (UI) that displays UI information and which receives user input via the UI. Communication interface 360 may include a transceiver(s) that enables device 300 to communicate with other devices and/or systems. For example, communication interface 360 may include one or more wired and/or wireless transceivers for communicating via mobile network 110 and/or data network 115. In the case of RUs of RAN 125, communication interface 360 may further include one or more antenna arrays for producing radio frequency (RF) cells or cell sectors.

The configuration of components of network device 300 illustrated in FIG. 3 is for illustrative purposes. Other configurations may be implemented. Therefore, network device 300 may include additional, fewer and/or different components, that may be arranged in a different configuration, than depicted in FIG. 3.

FIGS. 4A-4D are flow diagrams of an example process for implementing network load relief in mobile network 110 based on ML analytics and further based on user authorization of temporary service downgrades. The example process of FIGS. 4A-4D may be implemented by NWDAF 155 in conjunction with ML engine 175, PCF 165, UDM 160, and authorization app 180. In other embodiments, the example process of FIGS. 4A-4D may be implemented by NWDAF 155 in conjunction with one or more other nodes, NEs, network devices, and/or NFs of mobile network 110. The example process of FIGS. 4A-4D may be executed at intervals of time (e.g., a periodic interval), continuously, or upon the occurrence of one or more particular events (e.g., a known outage period, or a known or predicted peak network load period, in mobile network 110).

Figure 5A:
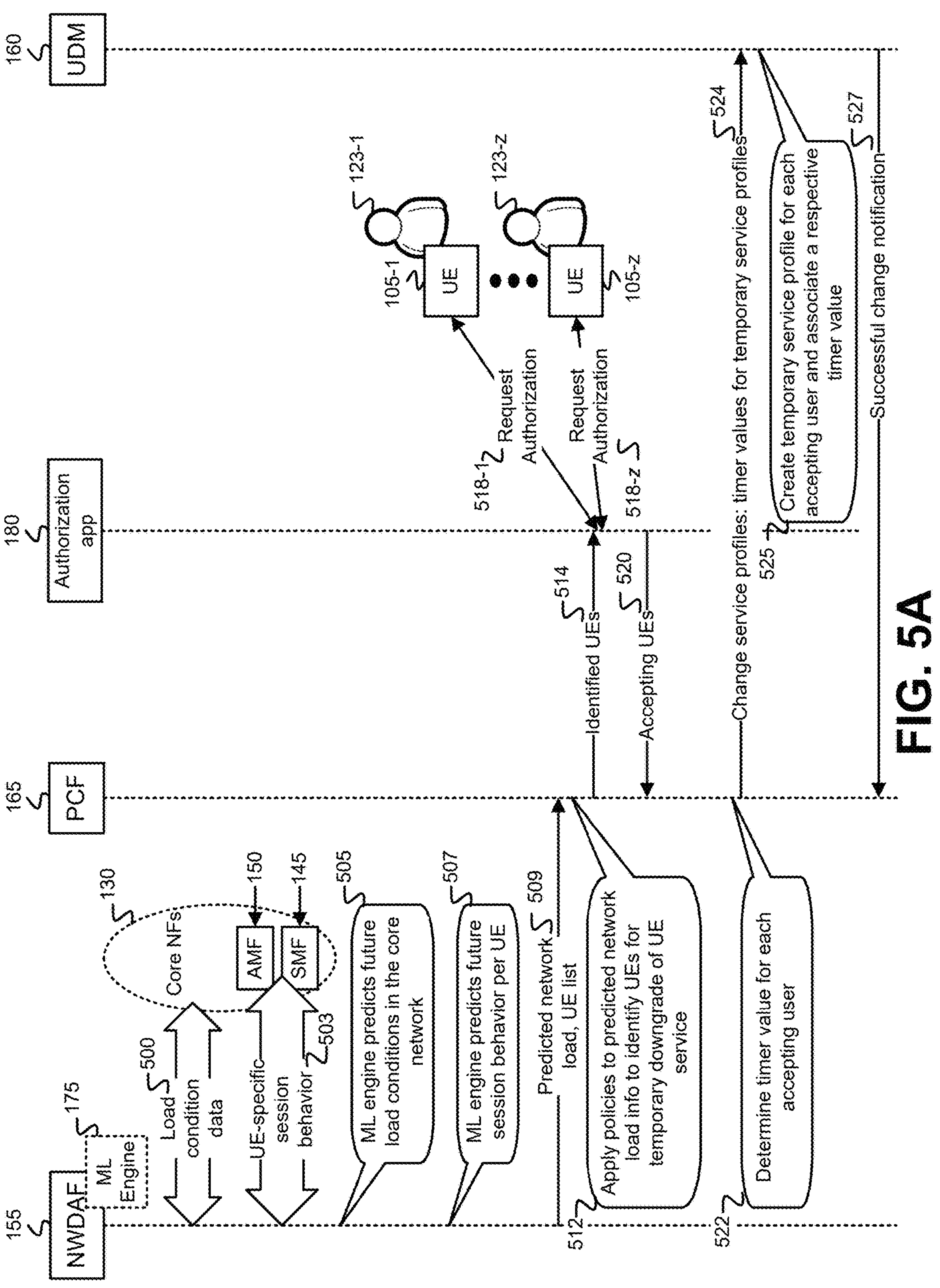
FIGS. 5A-5C are diagrams that illustrate sequences of operations, messages, and/or data flows associated with an example process.

The exemplary process includes NWDAF 155 collecting load condition data from various NFs in core network 130 of mobile network 110 (block 400). The NWDAF 155 may collect data describing a bandwidth utilization, a packet rate, an error rate, and/or a latency associated with the one or more nodes, NEs, or NFs in mobile network 110. For example, NWDAF 155 may collect load condition data, related to user plane traffic, from the DUs/RUs of RAN 125, CU-UP 135 and/or UPF 140. Additionally, or alternatively, NWDAF 155 may collect load condition data, related to control plane traffic, from CU-CP 137, AMF 150, SMF 145, NRF 170, PCF 165, and/or UDM 160. NWDAF 155 may further collect load condition data from other nodes, NEs, or NFs in mobile network 110. FIG. 5A shows NWDAF 155 collecting load condition data 500 from NFs of core network 130.

NWDAF 155 collects UE-specific communication session behavior data from SMF 145 and/or AMF 150 (block 403). The collected session behavior data may be collected on a per UE basis, with an identification of each UE, and data related to characteristics/behavior of each session involving each UE. The session behavior data may be collected continuously, periodically, or upon the occurrence of specific session related events. NWDAF 155 may additionally collect UE-specific session behavior data from other nodes, NEs, or NFs in mobile network other than SMF 145 and AMF 150. FIG. 5A further shows NWDAF 155 collecting UE-specific session behavior data 503 from AMF 150 and SMF 145 of core network 130.

ML engine 175 analyzes the collected load condition data and predicts future load conditions in the core network 130 (block 406). ML engine 175 may employ existing ML techniques to the collected load condition data (of block 400) from the one or more nodes, NEs, and NFs of mobile network and may generate predictive analytic data that includes predictions of future load conditions in mobile network 110. FIG. 5A depicts ML engine 175 predicting 505 future load conditions in the core network 130.

ML engine 175 analyzes the collected UE communication session behavior data and predicts future session behavior per UE (block 408). ML engine 175 may employ existing ML techniques to the collected UE-specific communication session behavior data, from, for example, SMF 145 and/or AMF 150, and may generate predictive analytic data that includes predictions of future session behavior of each UE 105. The predictive analytic data generated by ML engine 175 may include a list of UEs 105 predicted to produce heavy traffic during a specific period of time. ML engine 175 may, for example, predict UEs 105 whose peak traffic level during a particular time period exceeds a specified threshold, or whose average traffic level over a period of time exceeds a specified threshold. ML engine 175 may generate other types of analytic data, not described herein, based on the collected UE-specific communication session behavior data. FIG. 5A further depicts ML engine 175 predicting 507 future session behavior per UE 105.

ML engine 175 supplies predicted network load information and a list of UEs, predicted to produce heavy traffic, to PCF 165 (block 410). ML engine 175 sends the predicted network load conditions from block 406 and the list of UEs generated in block 408 to PCF 165. Instead of, or in addition to, the list of UEs generated in block 408, ML engine 175 may send other data analytics, not described herein, obtained from analyzing the collected UE communication session behavior data. As shown in FIG. 5A, NWDAF 155 sends a message 509 that includes the predicted network load and the list of UEs 105 to PCF 165.

PCF 165 applies policies to the predicted network load conditions to identify UEs 105 in the received list of UEs from which to request user authorization of a temporary downgrade in UE service (block 413), and sends the identified UEs 105 to authorization app 180 (block 415). The policies applied by PCF 165 may, for example, specify one or more levels of network load conditions (e.g., bandwidth utilization, packet rate, error rate, latency) in mobile network 110 and when the predicted network load conditions meet, exceed, or are lower than the specified levels, then PCF 165 identifies one or more UEs 105 within the list of UEs 105 to request authorization of a temporary downgrade of mobile network service. The temporary downgrade of network service may include, for example, lowering a QoS provided to each of the identified UEs from the list of UEs. PCF 165 generates a set of UEs 105, identified in block 413, inserts unique identifiers (IDs) for the UEs 105 from the set into a message, and sends the message to authorization app 180. The unique IDs for the UEs 105 in the set may be telephone numbers associated with each UE 105, email addresses for each user/subscriber associated with each UE 105, or unique IDs that may be mapped, by authorization app 180, to a respective telephone number or email address. FIG. 5A shows PCF 165 applying 512 polices to the predicted network load information to identify UEs for a temporary downgrade of UE service. FIG. 5A further shows PCF 165 sending a message 514 to the authorization app 180 that includes the identified UEs.

Authorization app 180 sends a text and/or email message to each of the identified UEs 105 of block 413 to request user authorization for temporarily downgrading each UE's service (block 418). Upon receipt of the message from PCF 165, authorization app 180 obtains a text address (e.g., telephone number) or email address associated with each UE 105 in the received set of UEs 105, and sends a text message or an email address to each UE 105 in the received set of UEs 105 that requests authorization to temporarily downgrade the UE 105's network service for a specified period of time. Alternatively, authorization app 180 may send the service downgrade request via other types of messaging, such as, for example, instant messages (IMs), or automated audio phone calls. After receipt of the message 514 that identifies UEs 105-1 through 105-*z*, authorization app 180, as shown in FIG. 5A, sends authorization requests 518-1 through 518-*z* to the UEs 105-1 through 105-*z* previously identified by PCF 165.

Each respective authorization request sent from authorization app 180 to each UE 105 in the received set of UEs 105 may include, for example, one or more incentive offers that each offers a particular incentive for the user/subscriber associated with each UE 105 to accept a specified level of network service downgrade. As one example, authorization app 180 may send a first incentive offer to at least one UE 105 in the set of UEs 105 that increases a monthly data quota for the user/subscriber by a particular amount of data if the user/subscriber authorizes a temporary service downgrade to a QoS level of L1, where the user's network service subscription includes a subscribed QoS level of L0, where QoS L0>QoS L1. As another example, authorization app 180 may send two incentive offers to at least one UE 105 in the set of UEs 105, where a first incentive offer increases a monthly data quota for the user by a particular amount of data D1 if the user authorizes a temporary service downgrade to a QoS level of L2, and a second incentive offer increases the monthly data quota for the user by a particular amount of data D2, where D2>D1, if the user authorizes a temporary service downgrade to a QoS of L3, where QoS L3<QoS L2<QoS L0. At least one, and possibly multiple, incentive offers may be provided to each UE 105 in the set of UEs 105 for incentivizing the user's authorization/approval of a particular downgrade in mobile network service. In circumstances where multiple incentive offers are provided to each UE 105, a respective user may select one of the multiple incentive offers.

Authorization app 180 notifies PCF 165 of users which accept/authorize the temporary downgrade of UE service (block 420). Authorization app 180 maintains a list of UEs 105, from the set of UE s 105 received from PCF 165, whose associated user has authorized the temporary downgrade of network service. In circumstances where multiple incentive offers have been provided to each user from the set of UEs 105, then authorization app 180 may further store an identification of the authorized/accepted incentive offer in association with each UE 105 whose user has authorized/accepted the particular temporary downgrade of network service contained in the incentive offer. After a specified period of time of attempting to obtain user authorization of the temporary network service downgrade, authorization app 180 collects IDs of the UEs 105 associated with users that have authorized the temporary downgrade in service, inserts the collected IDs into a message (possibly stored in association with IDs of the authorized/accepted incentive offer(s)), and returns the message to PCF 165. FIG. 5A depicts authorization app 180 sending a notification message 520 that notifies PCF 165 of the UEs 105 that have authorized/accepted the temporary downgrade of network service.

PCF 165 determines a timer value for each accepting/authorizing user and associated UE 105 (block 423). The timer value may be determined based on a length of the temporary network service downgrade accepted/authorized by each UE 105's user. The length of the temporary network service downgrade may have been specified in the original authorization request sent by authorization app 180 to each UE 105. For example, if the authorization request includes one or more incentive offers, each of the incentive offers may have specified a particular length of the temporary network service downgrade (e.g., 5 minutes, 15 minutes, 1 hour, 3 hours, 1 day) and by accepting the incentive offer, the user has accepted the particular length of the temporary network service downgrade set forth in the incentive offer. FIG. 5A shows PCF 165 determining 522 a timer value for each accepting/authorizing user.

PCF 165 instructs UDM 160 to change each authorizing user's service profile to a temporary service profile and associate a respective timer value (block 425). UDM 160 replaces the original service profile associated with each authorizing user with the temporary service profile and stores a respective timer value in association with the temporary service profile for each authorizing user. The temporary service profile, among other profile data related to the user's network service, specifies the downgraded network service level accepted/authorized by the user. FIG. 5A depicts PCF 165 sends a message 524 to UDM 160 that instructs UDM 160 to change network service profiles for each authorizing user to a temporary service profile, and further includes respective timer values for each temporary service profile. Upon receipt of the message 524, UDM 160 creates 525 a temporary service profile for each accepting/authorizing user and associates a respective timer value with each temporary service profile. UDM 160 further, as shown in FIG. 5A, returns a successful change notification 527 to authorization app 180 that indicates successful changes to the temporary service profiles for the authorizing users of the temporary service downgrade.

PCF 165 instructs authorization app 180 to notify each authorizing user associated with a UE 105 of initiation of the temporary service downgrade (block 427). FIG. 5B depicts PCF 165 sending an instruction 529 to authorization app 180 to notify each authorizing user of the initiation of the temporary service downgrade, and authorization app 180, in turn, sending a respective notification 531 to each UE 105-1 through 105-*z* associated with an authorizing user 123-1 through 123-*z*. The temporary service downgrade for each authorizing user and their associated UE 105 is then initiated by the applicable nodes, NEs, and/or NFs in mobile network 110, based on the content of the temporary service profile, and continues until the timer value for each UE 105 expires, as described further below. Subsequent to block 427, the example process may proceed to block 430 (FIG. 4B) with the monitoring of timers, or may optionally proceed to block 437 (FIG. 4C) with a further analysis of a current network load and current UE session behavior for, for example, extending a time period of the temporary network service downgrade at UEs 105 whose users have already authorized a temporary network service downgrade.

UDM 160 monitors expiration of the timers associated with each temporary service profile and, upon timer expiration, re-assigns each user's original service profile (block 430). Each timer may be associated with the temporary time period for which each respective user has authorized a network service downgrade. Expiration of a timer indicates that the authorized temporary time period for network service downgrade has elapsed, and UDM 160 then re-assigns the user's original service profile to replace the temporary service profile that was in effect during the duration of the timer. UDM 160 notifies PCF 165 of each timer expiration (block 432), and PCF 165 instructs the authorization app 180 to notify each authorizing user and associated UE 105 that the original service level has resumed (block 435). FIG. 5B shows UDM 160 monitoring 533 the timers associated with each temporary service profile, and, upon timer expiration, re-assigning the original service profile for each user in place of the temporary service profile. FIG. 5B further shows UDM 160 sending timer expiration notifications 535 to PCF 165 for each expiring timer, and sending an instruction 537 to authorization app 180 instructing app 180 to notify respective UEs 105 of a resumption of an original service level. Though not shown in FIG. 5B, authorization app 180 subsequently sends a notification to each UE 105-1 through 105-*z* that notifies each UE 105 of the resumption of the original service level. The notification may be sent via text message, email message, instant message, automated audio phone call, or via other types of messaging/notification mechanisms.

Figure 4A:
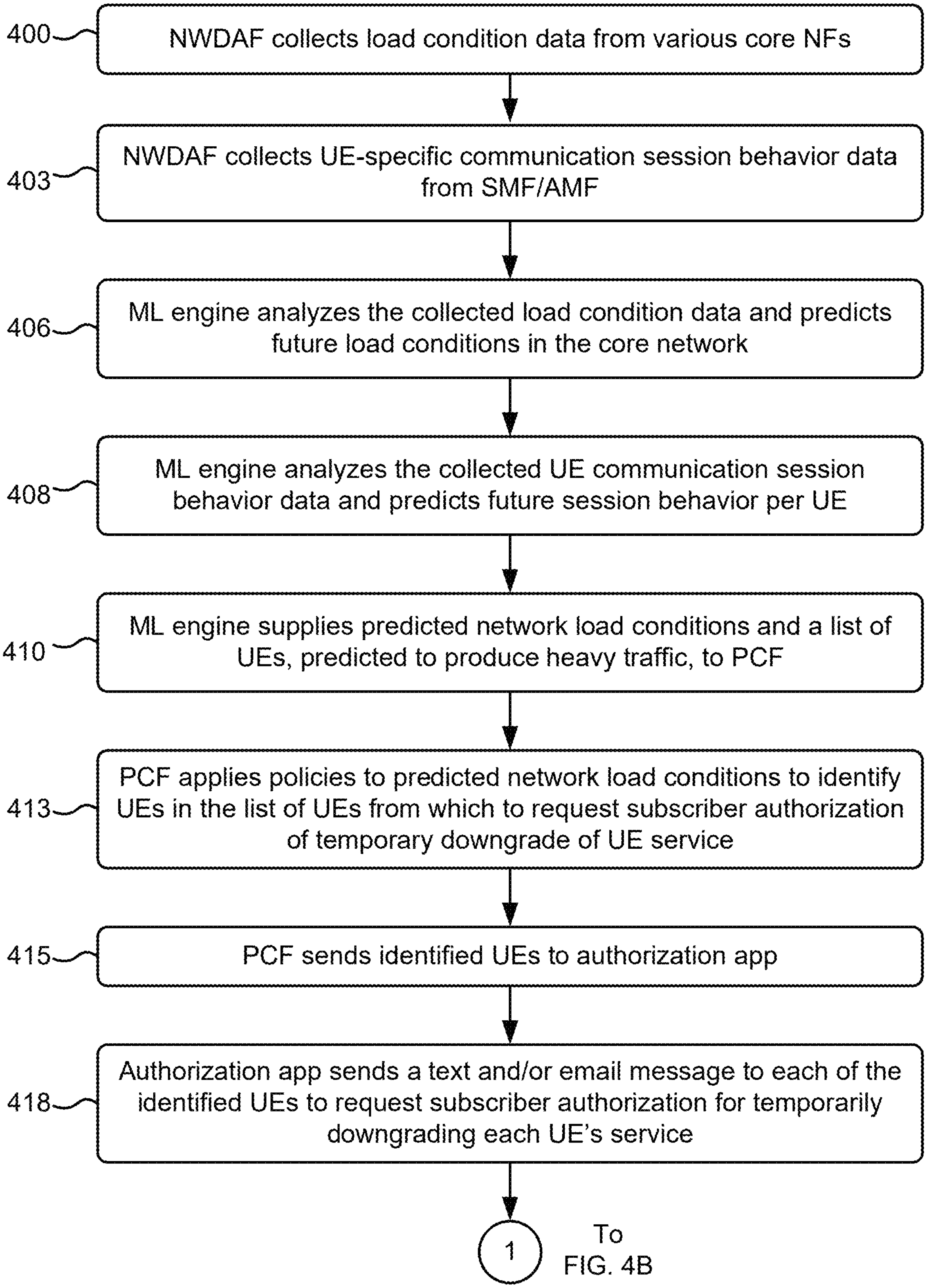
FIGS. 4A-4D are flow diagrams of an example process for implementing network load relief in a mobile network based on Machine Learning analytics.
Figure 4B:
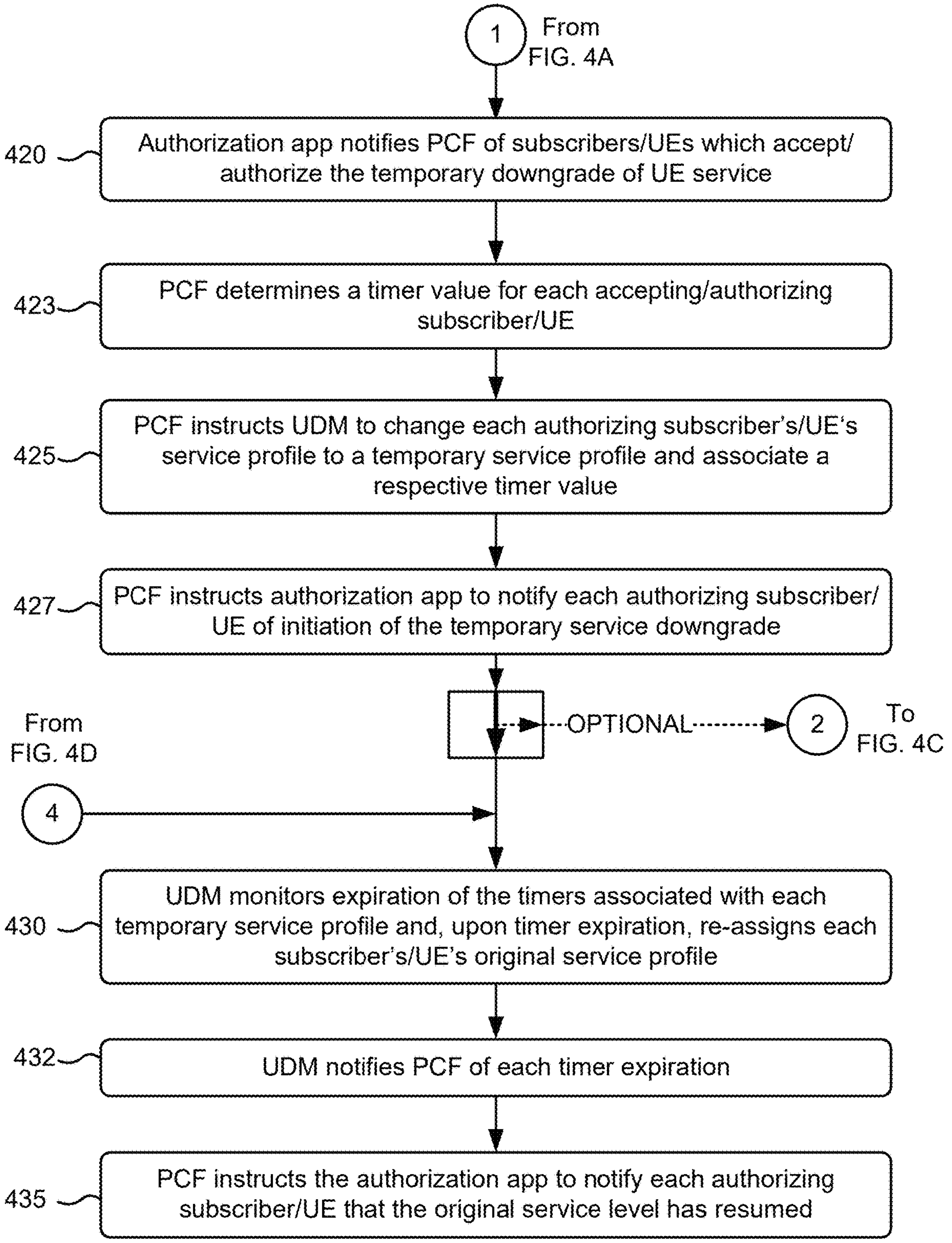
Figure 4C:
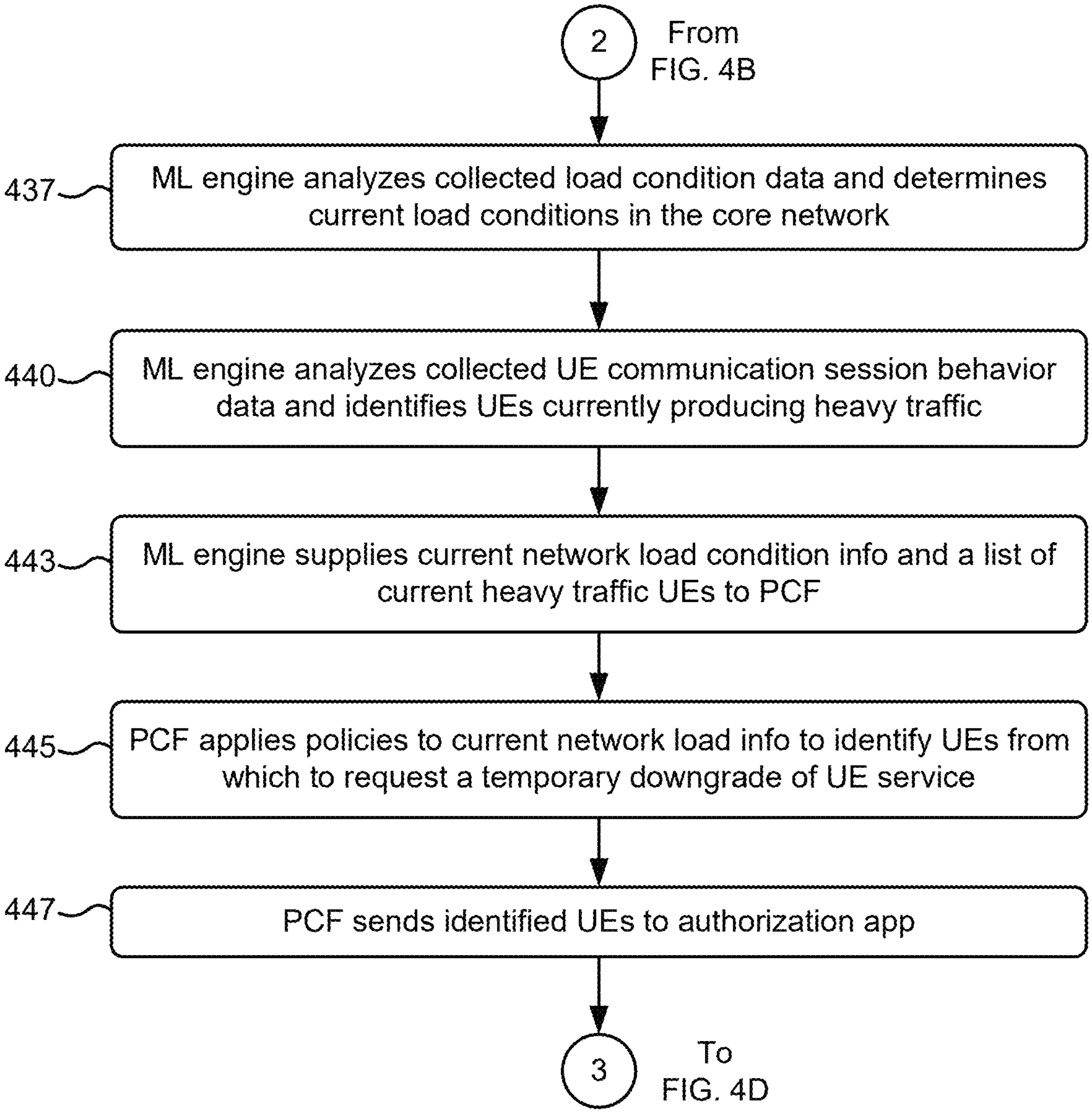
Figure 4D:
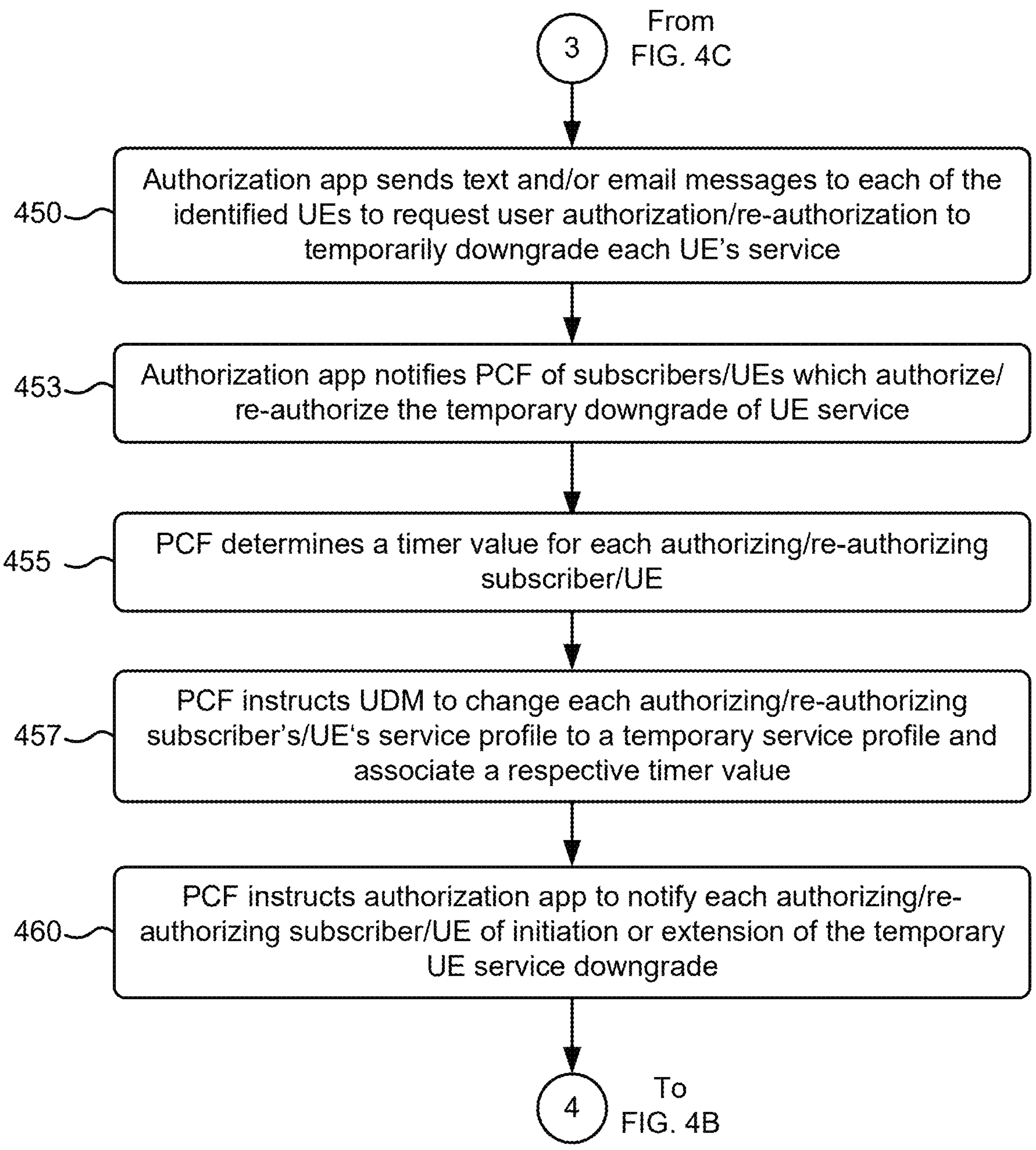
Figure 5B:
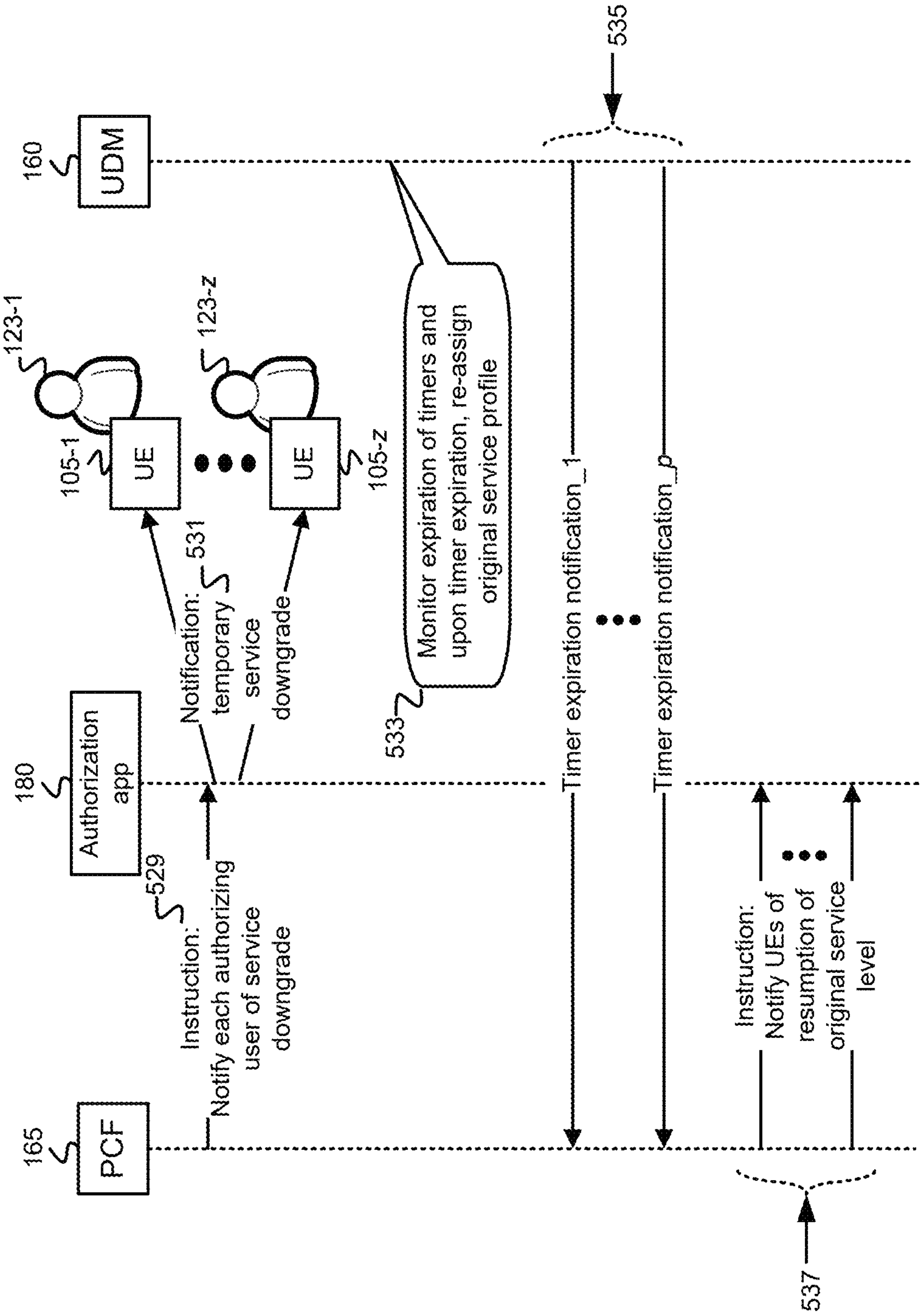

Subsequent to block 427 (FIG. 4B), optional blocks 437-447 of FIG. 4C and blocks 450-460 of FIG. 4D may executed for, for example, extending a duration of the temporary network service downgrade for users based on current load conditions in mobile network 110 and current UE session behavior data, as compared to the predicted load conditions and predicted UE session behavior previously used in blocks 406-413.

Figure 5C:
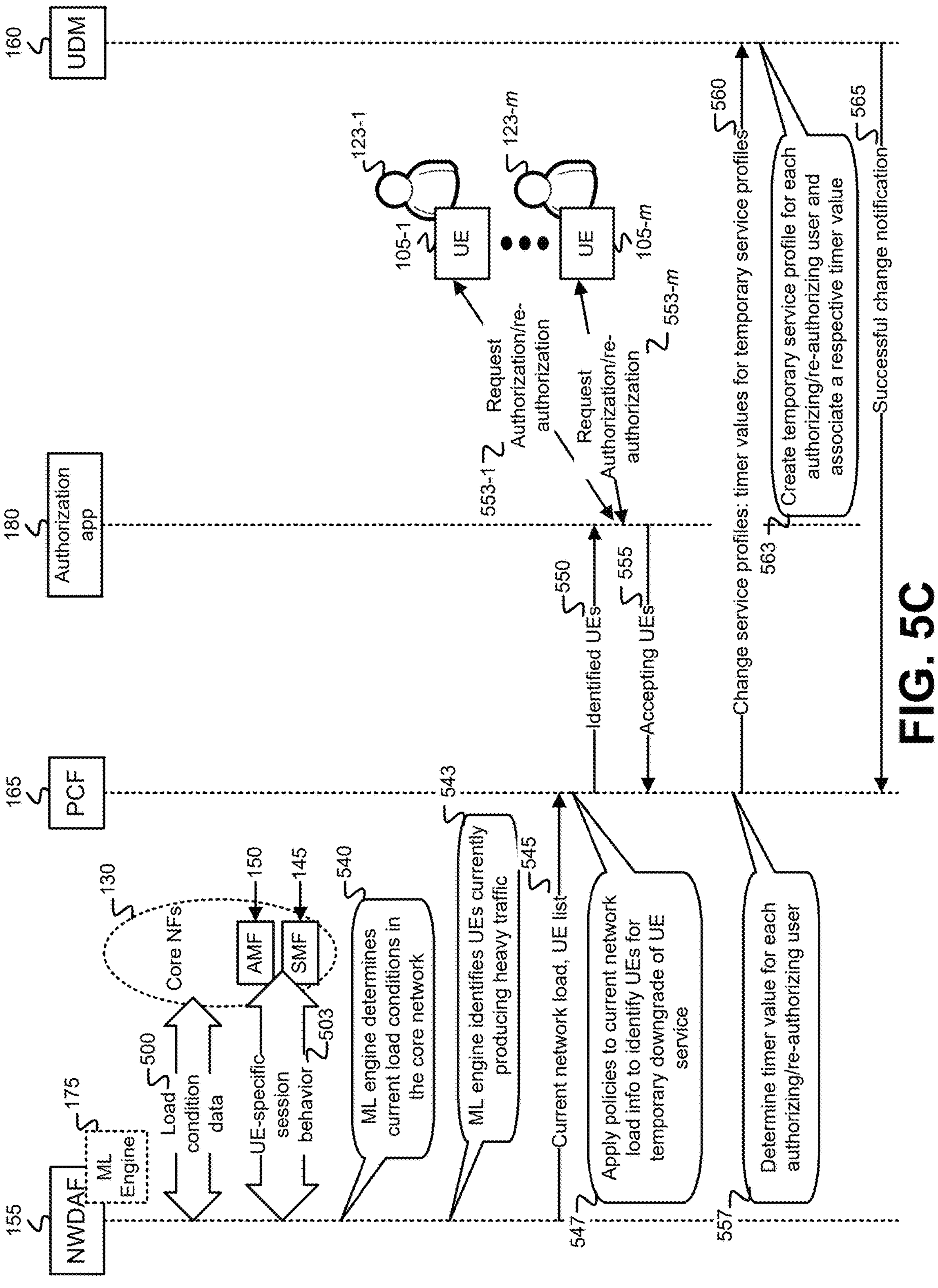

ML engine 175 analyzes the collected load condition data and determines current load conditions in the core network (block 437). ML engine 175 may analyze the collected load condition data (of block 400) from the one or more nodes, NEs, and NFs of mobile network 110 and may generate analytic data that describes current network load conditions. ML engine 175 may, for example, analyze current load condition data that includes data describing a bandwidth utilization, a packet rate, an error rate, and/or a latency associated with each of various nodes/NEs/NFs in mobile network 110. FIG. 5C depicts ML engine 175 determining 540 current load conditions in core network 130.

ML engine 175 analyzes the collected UE communication session behavior data and identifies UEs currently producing heavy traffic (block 440). ML engine 175 may analyze the collected UE-specific communication session behavior data, from, for example, SMF 145 and/or AMF 150, and may generate analytic data that describes current session behavior of UEs 105. The analytic data generated by ML engine 175 may include a list of UEs 105 currently producing heavy traffic during a specified period of time. ML engine 175 may, for example, determine UEs 105 whose current peak traffic level has exceeded a specified threshold, or whose current average traffic level has exceeded a specified threshold. ML engine 175 may generate other types of analytic data, not described herein, based on the collected UE-specific communication session behavior data. FIG. 5C shows ML engine 175 identifying 543 UEs 105 currently producing heavy traffic in mobile network 110.

ML engine 175 supplies current network load condition information and a list of current heavy traffic UEs 105 to PCF 165 (block 443). In some implementations ("pull" implementations), PCF 165 may first query NWDAF 155 for the current network load condition information, and NWDAF 155, or ML engine 175, may respond by returning the current network load condition information to PCF 165. In other implementations ("push" implementations), NWDAF 155 or ML engine 175 sends, without receiving a query from PCF 165, the current network load conditions from block 437 and the list of UEs generated in block 440 to PCF 165 periodically, or upon the occurrence of a particular event. Instead of, or in addition to, the list of UEs generated in block 440, ML engine 175 may send other data analytics, not described herein, obtained from analyzing the collected UE communication session behavior data. FIG. 5C shows ML engine 175 sending a message 545 that includes the current network load information, and UE list to PCF 165.

PCF 165 applies policies to the current network load information to identify UEs 105 from which to request a temporary downgrade of UE service (block 445). The identified UEs 105 may include UEs from the group of UEs 105 associated with users that already authorized a temporary network service downgrade in blocks 418 and 420. Alternatively, the identified UEs 105 may include all UEs 105 determined to currently be producing heavy traffic in mobile network 110, possibly including at least some of the UEs from the group of UEs 105 associated with users that already authorized the temporary network service downgrade.

The policies applied by PCF 165 may, for example, specify one or more levels of network load conditions (e.g., bandwidth utilization, packet rate, error rate, latency) in mobile network 110 and when the current network load conditions (as determined in block 437) meet, exceed, or are lower than the specified levels, then PCF 165 identifies one or more UEs 105 within the list of UEs 105 (from block 443) to request authorization of a temporary downgrade of mobile network service, or re-authorization of an extension in an existing temporary downgrade of mobile network service. FIG. 5C depicts PCF 165 applying 547 policies to current network load information to identify UEs for an extension of a previous temporary downgrade of UE service and/or to identify new UEs for a temporary downgrade of UE network service.

PCF 165 sends the identified UEs 105 to authorization app 180 (block 447), and authorization app 180 sends a text and/or email message to each of the identified UEs 105 of block 445 to request user authorization for temporarily downgrading each UE's service and/or for re-authorizing an extension of an existing temporary network service downgrade (block 450). PCF 165 generates a set of UEs 105, identified in block 445, inserts unique identifiers (IDs) for the UEs 105 from the set into a message, and sends the message to authorization app 180. The unique IDs for the UEs 105 in the set may be telephone numbers associated with each UE 105, email addresses for each user associated with each UE 105, or unique IDs that may be mapped, by authorization app 180, to a respective telephone number or email address. Upon receipt of the message from PCF 165, authorization app 180 obtains a text address (e.g., telephone number) or email address associated with each UE 105 in the received set of UEs 105, and sends a text message or an email address to each UE 105 in the received set of UEs 105 that requests authorization to temporarily downgrade the UE 105's network service for a specified period of time, or to re-authorize an extension of an existing temporary network service downgrade for an additional, specified period of time. Alternatively, authorization app 180 may send the service downgrade request via other types of messaging, such as, for example, instant messages (IMs), or automated audio phone calls. The authorization request sent from authorization app 180 to each UE 105 in the received set of UEs 105 may include, for example, one or more incentive offers, such as described above.

Authorization app 180 notifies PCF 165 of users which accept/authorize the temporary downgrade of UE service (block 453). Authorization app 180 maintains a list of UEs 105, from the set of UE s 105 received from PCF 165, whose associated user has authorized/re-authorized the temporary downgrade of network service. In circumstances where multiple incentive offers have been provided to each user from the set of UEs 105, then authorization app 180 may further store an identification of the authorized/accepted incentive offer in association with each UE 105 whose user has authorized/re-authorized the particular temporary downgrade of network service contained in the incentive offer. After a specified period of time of attempting to obtain user authorization of the temporary network service downgrade, authorization app 180 collects IDs of the UEs 105 associated with users that have authorized/re-authorized the temporary downgrade in service, inserts the collected IDs into a message (possibly stored in association with IDs of the authorized/accepted incentive offer(s)), and returns the message to PCF 165. FIG. 5C shows PCF 165 sending a message 550, that includes the identified UEs (identified in block 445), and authorization app 180 sending authorization/re-authorization requests 553-1 through **553-*m* to UEs 105-1 through 105-*m***.

PCF 165 determines a timer value for each authorizing/re-authorizing user (block 455). The timer value may be determined based on a length of the temporary network service downgrade authorized/re-authorized by each UE 105's user. The length of the temporary network service downgrade may have been specified in the authorization/re-authorization request sent by authorization app 180 to each UE 105. For example, if the authorization/re-authorization request includes one or more incentive offers, each of the incentive offers may have specified a particular length of the temporary network service downgrade (e.g., 5 minutes, 15 minutes, 1 hour, 3 hours, 1 day) and by accepting the incentive offer, the user has accepted the particular length of the temporary network service downgrade set forth in the incentive offer. FIG. 5C shows PCF 165 determining 557 a timer value for each user that authorized or re-authorized a temporary network service downgrade.

PCF 165 instructs UDM 160 to change each authorizing/re-authorizing user's service profile to a temporary service profile and associate a respective timer value (block 457). UDM 160 replaces the original service profile associated with each authorizing user, or a most recent temporary service profile (from a previous authorization of a temporary service downgrade), with a new temporary service profile and stores a new respective timer value in association with the new temporary service profile for each authorizing/re-authorizing user. The new temporary service profile, among other profile data related to the user's network service, specifies the downgraded network service level authorized/re-authorized by the user. FIG. 5C shows PCF 165 sending a message 560 that instructs UDM 160 to change the identified UEs service profiles and which further includes the previously determined timer values for each of the identified UEs. As further shown, UDM 160, in response to message 560, creates 563 a temporary service profile for each authorizing/re-authorizing user, and replaces the current service profile for each authorizing/re-authorizing user with the newly created temporary service profile. UDM 160 further stores, in association with each temporary service profile, a respective timer value received from PCF 165. Once the service profile changes are made, UDM 160 returns a successful change notification 527 to PCF 165.

PCF 165 instructs authorization app 180 to notify each authorizing/re-authorizing user of initiation, or extension, of the temporary UE service downgrade (block 460). Authorization app 180 may notify each user at their respective UE 105 via, for example, text message, email message, instant message, and/or automated audio phone call. The temporary service downgrade for each authorizing user and their associated UE 105 may then be initiated, or extended, by the applicable nodes, NEs, and/or NFs in mobile network 110, based on the content of each UE 105's temporary service profile, and continues until the timer value for each UE 105 expires, as described further below.

Returning to block 430 (FIG. 4B), UDM 160 monitors expiration of the timers associated with each temporary service profile and, upon timer expiration, re-assigns each user's original service profile. As previously described, each timer may be associated with the temporary time period for which each respective user has authorized/re-authorized a network service downgrade. Expiration of the timer indicates that the authorized/re-authorized temporary time period for network service downgrade has elapsed, and UDM 160 then re-assigns the user's original service profile to replace the temporary service profile that was in effect during the duration of the timer. UDM 160 notifies PCF 165 of each timer expiration (block 432), and PCF 165 instructs the authorization app 180 to notify each authorizing user associated with a UE 105 that the original service level has resumed (block 435). Authorization app 180 may notify each user at their respective UE 105 of resumption of the original network service level via, for example, text message, email message, instant message, and/or automated audio phone call.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 4A-4D, and sequences of operations, messages, and/or data flows with respect to FIGS. 5A-5C, the order of the blocks and/or the operations, messages, and/or data flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processing unit 320) of a device. A non-transitory storage medium includes one or more of the storage mediums described in relation to memory 330. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a," "an," and "the" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

collecting load condition data from first nodes, network elements (NEs), and/or network functions (NFs) in a mobile network;

applying machine learning to the collected load condition data to generate predicted future load conditions in the mobile network;

sending, based on the predicted future load conditions, at least one first authorization request, to selected user equipment devices (UEs) that are using the mobile network, wherein the at least one first authorization request requests authorization by a respective user associated with each of the selected UEs for a temporary downgrade in mobile network service;

selectively downgrading mobile network service to one or more of the selected UEs, for a temporary time period, based on responses to the at least one first authorization request;

analyzing the collected load condition data to determine current load conditions in the mobile network; and sending, based on the determined current load conditions, at least one second authorization request to at least one of the one or more of the selected UEs, to request extension of the temporary time period for temporarily downgrading the mobile network service.

2. The method of claim 1, wherein the at least one first authorization request specifies multiple different levels of temporary network service downgrade and further comprising:

receiving, in response to the at least one first authorization request, authorizations and rejections of the temporary mobile network service downgrade;

wherein selectively downgrading the mobile network service further comprises:

temporarily downgrading mobile network service for first UEs of the selected UEs to a first level of the multiple different levels based on the authorizations; and temporarily downgrading mobile network service for second UEs of the selected UEs to a second level of the multiple different levels based on the authorizations.

3. The method of claim 1, wherein the at least one authorization request includes at least one incentive offer that incentivizes user authorization of the temporary downgrade in the mobile network service.

4. The method of claim 1, wherein sending the at least one first authorization request comprises:

sending the at least one first authorization request via at least one of text message, email, instant message (IM), or automated audio phone call.

5. The method of claim 1, further comprising:

collecting UE communication session behavior data from one or more second nodes, NEs, and/or NFs in the mobile network;

applying machine learning to the collected UE communication session behavior data to predict future session behavior of a set of UEs that are using the mobile network;

identifying a list of UEs from the set of UEs based on the predicted future session behavior; and identifying the selected UEs from the list of UEs based on the predicted future load conditions.

6. The method of claim 5, wherein identifying the selected UEs from the list of UEs further comprises:

applying, by a policy control function (PCF), policies to the predicted future load conditions to identify the selected UEs from the list of UEs.

7. The method of claim 1, further comprising:

applying, by a policy control function (PCF), policies to the predicted future load conditions to identify the selected UEs to which the at least one first authorization request is sent.

8. The method of claim 1, further comprising:

extending a length of the temporary time period, for the downgrading of the mobile network service for the least one of the one or more of the selected UEs, based on responses to the at least one second authorization request.

9. A network device, comprising:

at least one communication interface configured to:

receive, from a machine learning (ML) engine, predicted future network load conditions associated with UE traffic at nodes, network elements (NEs), and/or network functions (NFs) in a mobile network, and receive, from the ML engine, current load conditions associated with the traffic at the nodes, NEs, and/or NFs in the mobile network; and at least one processor configured to implement a policy control function (PCF) to:

apply policies to the predicted future network load conditions to select UEs as candidates for temporary downgrades in mobile network service, initiate sending of at least one first authorization request to the selected UEs to request authorization for the implementation of a temporary downgrade in mobile network service for each of the selected UEs, cause mobile network service to be downgraded to one or more of the selected UEs, for a temporary time period, based on responses to the at least one first authorization request, and initiate sending, based on the current load conditions, at least one second authorization request to at least one of the one or more of the selected UEs, to request extension of the temporary time period for temporarily downgrading the mobile network service.

10. The network device of claim 9, wherein the at least one first authorization request specifies multiple different levels of temporary network service downgrade and wherein the processor is configured to:

receive, subsequent to the at least one first authorization request, a notification that identifies user authorizations and user rejections of the temporary mobile network service downgrade;

wherein, when causing the mobile network service to be downgraded, the processor is further configured to:

cause a temporary mobile network service downgrade for first UEs of the one or more selected UEs to a first level of the multiple different levels based on the authorizations; and cause a temporary mobile network service downgrade for second UEs of the one or more selected UEs to a second level of the multiple different levels based on the authorizations.

11. The network device of claim 9, wherein the at least one first authorization request includes at least one incentive offer that incentivizes authorization of the temporary downgrade in the mobile network service.

12. The network device of claim 9, wherein, when initiating the sending of the at least one first authorization request to the selected UEs, the processor is further configured to:

initiate the sending of the at least one first authorization request via at least one of text message, email, instant message (IM), or automated audio phone call.

13. The network device of claim 9, wherein the at least one processor is further configured to implement the PCF to:

apply the policies to the current load conditions to select the at least one of the one or more of the selected UEs as candidates for extending the temporary downgrades in mobile network service.

14. The network device of claim 9, wherein the at least one processor is further configured to implement the PCF to:

cause a length of the temporary time period to be extended, for the downgrading of the mobile network service for the at least one of the one or more of the selected UEs, based on responses to the at least one second authorization request.

15. A non-transitory storage medium storing instructions executable by a network device, wherein the instructions comprise instructions to cause the network device to:

receive, from a machine learning (ML) engine, predicted future network load conditions associated with traffic at nodes, network elements (NEs), and/or network functions (NFs) in a mobile network;

receive, from the ML engine, current load conditions associated with the traffic at the nodes, NEs, and/or NEs in the mobile network;

apply policies to the predicted future network load conditions to select UEs as candidates for temporary downgrades in mobile network service;

initiate sending of at least one first authorization request to the selected UEs to request authorization for the implementation of a temporary downgrade in mobile network service for each of the selected UEs;

cause mobile network service to be downgraded to one or more of the selected UEs, for a temporary time period, based on responses to the at least one first authorization request; and initiate sending, based on the current load conditions, at least one second authorization request to at least one of the one or more of the selected UEs, to request extension of the temporary time period for temporarily downgrading the mobile network service.

16. The non-transitory storage medium of claim 15, wherein the at least one authorization request specifies multiple different levels of temporary network service downgrade, and wherein the instructions further comprise instructions to cause the network device to:

receive, subsequent to the at least one authorization request, a notification that identifies authorizations and rejections of the temporary mobile network service downgrade, cause a temporary mobile network service downgrade for first UEs of the one or more selected UEs to a first level of the multiple different levels based on the authorizations; and cause a temporary mobile network service downgrade for second UEs of the one or more selected UEs to a second level of the multiple different levels based on the authorizations.

17. The non-transitory storage medium of claim 15, wherein the at least one first authorization request includes at least one incentive offer that incentivizes authorization of the temporary downgrade in the mobile network service.

18. The non-transitory storage medium of claim 15, wherein the instructions to cause the network device to initiate the sending of the at least one first authorization request to the selected UEs further comprise instructions to cause the network device to:

initiate the sending of the at least one first authorization request via at least one of text message, email, instant message (IM), or automated audio phone call.

19. The non-transitory storage medium of claim 15, wherein the instructions further comprise instructions to cause the network device to:

apply the policies to the current load conditions to select the at least one of the one or more of the selected UEs as candidates for extending the temporary downgrades in mobile network service.

20. The non-transitory storage medium of claim 15, wherein the instructions further cause the network device to:

cause a length of the temporary time period to be extended, for the downgrading of the mobile network service for the at least one of the one or more of the selected UEs, based on responses to the at least one second authorization request.

* * * * *